(12) United States Patent
Hosabettu et al.

(10) Patent No.: US 9,952,658 B2
(45) Date of Patent: Apr. 24, 2018

(54) SYSTEM AND METHOD FOR IMPROVING VIEWING EXPERIENCE ON A DIGITAL DEVICE

(71) Applicants: Raghavendra Hosabettu, Bangalore (IN); Kiran Kumar Channarayapatna Sathyanarayana, Bangalore (IN); Parthasarathy Shunmugam Armugasamy, Bangalore (IN)

(72) Inventors: Raghavendra Hosabettu, Bangalore (IN); Kiran Kumar Channarayapatna Sathyanarayana, Bangalore (IN); Parthasarathy Shunmugam Armugasamy, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 110 days.

(21) Appl. No.: 14/748,076

(22) Filed: Jun. 23, 2015

(65) Prior Publication Data

US 2016/0274656 A1    Sep. 22, 2016

(30) Foreign Application Priority Data

Mar. 17, 2015 (IN) .......................... 1313/CHE/2015

(51) Int. Cl.
G06F 3/01  (2006.01)
G06F 3/00  (2006.01)
G09G 5/00  (2006.01)

(52) U.S. Cl.
CPC .............. *G06F 3/005* (2013.01); *G06F 3/013* (2013.01); *G09G 5/003* (2013.01);
(Continued)

(58) Field of Classification Search
CPC ......... G06F 3/005; G06F 3/013; G09G 5/003; G09G 2320/0261; G09G 2354/00; G09G 2320/08
See application file for complete search history.

(56) References Cited

U.S. PATENT DOCUMENTS 8,947,355 B1 *  2/2015  Karakotsios ............ G06F 3/017
                                            345/156
2005/0134194 A1   6/2005  Murata
(Continued)

FOREIGN PATENT DOCUMENTS

EP        2 605 125 A1     6/2013
EP        2 713 359 A2     9/2013
WO    WO 2006/072866 A1    7/2006

*Primary Examiner* — Ibrahim A Khan
(74) *Attorney, Agent, or Firm* — Finnegan, Henderson, Farabow, Garrett & Dunner LLP

(57) ABSTRACT

This disclosure relates to system and method for improving viewing experience of a user on a digital device. In one embodiment, a method is provided for improving viewing experience of a user on a digital device. The method, at a first instance, comprises determining a plurality of first vision parameters for two or more viewing positions based on a plurality of first sensor parameters and a plurality of viewing experiences of the user for the two or more viewing positions, deriving a base viewability index based on the plurality of first vision parameters for the two or more viewing positions, and creating a user profile comprising the base viewability index of the user. The method, at a subsequent instance, further comprises determining a plurality of subsequent vision parameters for a current viewing position based on a plurality of subsequent sensor parameters for the current viewing position and attributes of a digital content, deriving a dynamic viewability index based on the plurality of subsequent vision parameters for the current viewing position, and dynamically adjusting display settings based on a comparison between the dynamic viewability index and the base viewability index, and presenting the digital content to the user based on the adjusted display settings.

18 Claims, 4 Drawing Sheets

(52) U.S. Cl.
CPC . *G09G 2320/0261* (2013.01); *G09G 2320/08* (2013.01); *G09G 2354/00* (2013.01)

(56) References Cited

U.S. PATENT DOCUMENTS

| | | | |
|---|---|---|---|
| 2005/0225723 A1* | 10/2005 | Pilu | A61B 3/113 |
| | | | 351/209 |
| 2006/0053311 A1 | 3/2006 | Chary | |
| 2006/0140502 A1 | 6/2006 | Tseng et al. | |
| 2008/0062297 A1* | 3/2008 | Sako | G02B 27/017 |
| | | | 348/333.02 |
| 2009/0278032 A1 | 11/2009 | Tilmann et al. | |
| 2010/0103197 A1 | 4/2010 | Liu | |
| 2010/0205667 A1* | 8/2010 | Anderson | G06F 3/013 |
| | | | 726/19 |
| 2010/0299395 A1 | 11/2010 | Klassen | |
| 2011/0022958 A1 | 1/2011 | Kang et al. | |
| 2011/0069096 A1 | 3/2011 | Li et al. | |
| 2012/0019152 A1 | 1/2012 | Barnhoefer et al. | |
| 2012/0327123 A1 | 12/2012 | Felt | |
| 2013/0019204 A1 | 1/2013 | Kotler et al. | |
| 2014/0055483 A1 | 2/2014 | Pance et al. | |
| 2014/0137054 A1 | 5/2014 | Gandhi et al. | |
| 2015/0338915 A1* | 11/2015 | Publicover | H04N 5/23229 |
| | | | 345/633 |
| 2016/0078594 A1* | 3/2016 | Scherlen | G09G 5/00 |
| | | | 345/428 |
| 2016/0085299 A1* | 3/2016 | Horesh | G06F 3/013 |
| | | | 345/156 |
| 2016/0314763 A1* | 10/2016 | Matthews | G09G 5/02 |
| 2017/0285740 A1 | 10/2017 | Jönsson et al. | |

* cited by examiner

SYSTEM AND METHOD FOR IMPROVING VIEWING EXPERIENCE ON A DIGITAL DEVICE

PRIORITY CLAIM

This U.S. patent application claims priority under 35 U.S.C. § 119 to India Application No. 1313/CHE/2015, filed Mar. 17, 2015. The entire content of the aforementioned application is incorporated herein by reference.

DESCRIPTION

Technical Field

This disclosure relates generally to display enhancement technique, and more particularly to system and method for improving viewing experience of a user on a digital device.

Background

Digital devices have become ubiquitous in recent years. With evolving lifestyles, improved technologies, and ever changing socio-economic behavior, people are increasingly using these digital devices to perform day-to-day activities and to consume a wide variety of digital contents. All such data consumption and performance of day-to-day activities through the digital devices are made possible through one primary user activity—'viewing'. However, each person's vision needs may be unique and different from another. Low vision may result due to any of the parameters including, but not limited to, distance from the display, light intensity of the environment, glare from windows and lights, direction of the vision, colours of the prints/fonts, size of the prints/fonts, styles of the prints/fonts, contrast of the prints/fonts, spacing between the letters, and so forth. Thus, poor readability or low vision may hinder one's reading, learning, gaming, watching, and browsing experience on the digital device.

Existing techniques to address unique vision needs involves magnification, adjustments of display settings, and so forth when a user is experiencing low vision due to one or many vision parameters. For example, one existing approach to help users with visual needs is through the use of lenses. However, lenses are additional assets that need to be always carried and worn. Contact lenses have their own challenges of maintenance and utility. Moreover, a user despite using the lenses may find viewing and reading difficult on a digital display for reasons, such as, low or poor light, mini screen, glare, small fonts, color blindness, and so forth.

Additionally, existing eye sight correction techniques employed on the digital device are limited in their scope. For example, magnification of the digital content is limited to automatic adjustment of font/image size on a visual display by determining only the distance between the user and the mobile device, or by considering one or more vision states of a user of a mobile device. However, such silo approaches still fails to provide the users a holistic and better viewing experience in real time.

SUMMARY

In one embodiment, a system for improving viewing experience of a user is disclosed. In one example, the system comprises a plurality of sensors, a processor, and a display. The plurality of sensors is configured to capture sensor parameters. The processor, at a first instance, is configured to determine a plurality of first vision parameters for two or more viewing positions based on a plurality of first sensor parameters and a plurality of viewing experiences of the user for the two or more viewing positions, to derive a base viewability index based on the plurality of first vision parameters for the two or more viewing positions, and to create a user profile comprising the base viewability index of the user. The processor, at a subsequent instance, is further configured to determine a plurality of subsequent vision parameters for a current viewing position based on a plurality of subsequent sensor parameters for the current viewing position and attributes of a digital content, to derive a dynamic viewability index based on the plurality of subsequent vision parameters for the current viewing position, and to dynamically adjust display settings based on a comparison between the dynamic viewability index and the base viewablity index. The display is configured to present the digital content to the user based on the adjusted display settings.

In one embodiment, a method for improving viewing experience of a user on a digital device is disclosed. In one example, the method, at a first instance, comprises determining a plurality of first vision parameters for two or more viewing positions based on a plurality of first sensor parameters and a plurality of viewing experiences of the user for the two or more viewing positions, deriving a base viewability index based on the plurality of first vision parameters for the two or more viewing positions, and creating a user profile comprising the base viewability index of the user. The method, at a subsequent instance, further comprises determining a plurality of subsequent vision parameters for a current viewing position based on a plurality of subsequent sensor parameters for the current viewing position and attributes of a digital content, deriving a dynamic viewability index based on the plurality of subsequent vision parameters for the current viewing position, dynamically adjusting display settings based on a comparison between the dynamic viewability index and the base viewablity index, and presenting the digital content to the user based on the adjusted display settings.

In one embodiment, a non-transitory computer-readable medium storing computer-executable instructions for improving viewing experience of a user on a digital device is disclosed. In one example, the stored instructions, when executed by a processor, cause the processor to perform, at a first instance, operations comprising determining a plurality of first vision parameters for two or more viewing positions based on a plurality of first sensor parameters and a plurality of viewing experiences of the user for the two or more viewing positions, deriving a base viewability index based on the plurality of first vision parameters for the two or more viewing positions, and creating a user profile comprising the base viewability index of the user. Further, the stored instructions, when executed by a processor, cause the processor to perform, at a subsequent instance, operations comprising determining a plurality of subsequent vision parameters for a current viewing position based on a plurality of subsequent sensor parameters for the current viewing position and attributes of a digital content, deriving a dynamic viewability index based on the plurality of subsequent vision parameters for the current viewing position, dynamically adjusting display settings based on a comparison between the dynamic viewability index and the base viewablity index, and presenting the digital content to the user based on the adjusted display settings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
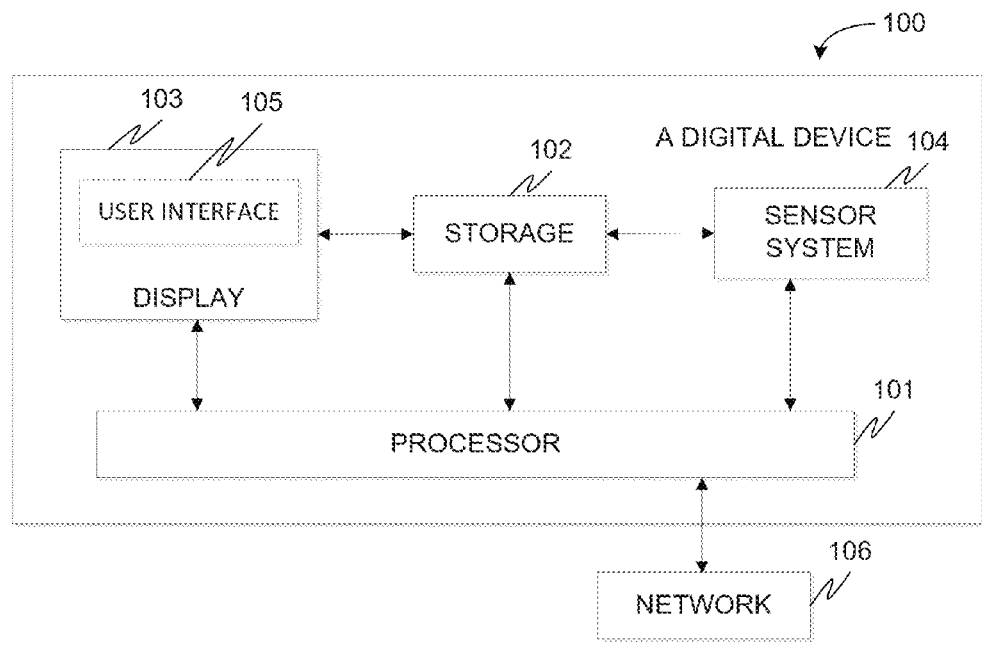
FIG. 1 is a block diagram of an exemplary system for improving viewing experience of a user in accordance with some embodiments of the present disclosure.

Referring now to FIG. 1, an exemplary system 100 for improving viewing experience of a user is illustrated in accordance with some embodiments of the present disclosure. In particular, the system 100 includes a digital device that implements a technique so as to determine optimal vision requirement of a user and accordingly improve viewing experience of the user in real time while presenting a digital content on the digital display. The system 100 comprises one or more processors 101, a computer-readable storage medium (e.g., a memory) 102, a display 103, and a sensor system 104. The computer-readable storage medium 102 stores instructions that, when executed by the one or more processors 101, cause the one or more processors 101 to perform display enhancement technique in accordance with aspects of the present disclosure. The system 100 interacts with users via a user interface 105 accessible via the display 103. The system 100 may also interact with other devices, computers, and servers over a communication network 106 for sending or receiving data.

The sensor system 104 includes a number of sensors that captures multiple sensor parameters in real time as required by the one or more processors 101. The sensors may include, but are not limited to, a GPS sensor, an accelerometer, a gyroscope, a proximity sensor, a light intensity detector, an infrared sensor, a camera, a microphone, a humidity sensor, a beacon, and a biometric sensor. As will be appreciated by those skilled in the art, the sensor parameters are real time measurements of ambient condition or contextual information surrounding the system or the digital device. The sensor parameters may include, but are not limited to, a location of the user, a viewing distance, a viewing direction, a viewing position, a linear acceleration in each of three coordinate axis, an ambient light intensity, a glare, a current display settings, a camera picture, a video stream, a voice recording, another nearby beacon, a position of sun, a humidity level, and a biometric signature.

The one or more processors 101 are configured to determine the vision parameters for one or more viewing positions based on the sensor parameters captured by the sensors for corresponding one or more viewing positions. In some embodiments, the processors 101 may further derive vision parameters based on viewing experiences of the user for multiple digital contents and for multiple viewing positions, or attributes of the multiple digital contents presented to the user. The vision parameters may include, but are not limited to, a size of face of the user, a inter pupil distance of the user, a movement of pupils, a relative viewing distance, a relative viewing direction, a relative viewing position, a pitch-yaw-roll rates for the viewing position, an indoor or an outdoor position of the digital device, a relative position of sun with respect to the digital device, a humidity level on the surface of the display of the digital device, a length of text line (based on angle of hold, font size, font space, and so forth), a time taken by the user to read a text, a number of pauses taken during reading, a number of filler phrases (e.g., 'aa', 'um', and so forth) used during reading, and other user behaviors with respect to viewing or reading of the digital contents. The processors 101 are further configured to derive a viewability index based on the vision parameters so derived. In some embodiments, the viewability index may include a readability index. The viewability index is a unique vector corresponding to the user that defines viewing requirement or experience of the user at a given ambient condition surrounding the system or the digital device. In some embodiments, the processors 101 are configured to derive the viewability index by performing time series analysis of the vision parameters. The processors 101 are further configured to create a user profile comprising of the viewability index corresponding to the user and store the user profile in the storage medium 102 while training the system. The processors 101 may subsequently access the stored user profile from the store medium 102 during actual use or operation based on an identification of the user. As will be appreciated by those skilled in the art, the storage medium 102 further stores user profile details, vision parameters, multiple sensor data or parameters, and any external vision and weather related corroborative data. It should be noted that the vision and weather related corroborative data may be accessed by the system 100 from external sources over the communication network 106.

The display 103 provides visualization capability for viewing digital contents on the digital device. The display 103 is configured to improve the viewing experience of the user based on user's profile while presenting the digital contents in accordance with some embodiments of the present disclosure. As noted above, the display is further configured to provide the user interface 105 for interacting with the users. The user interface 105 enables the system 100 to access viewing experiences of the user while capturing sensor parameters and deriving vision parameters. In some embodiments, the user interface may guide the user to perform one or more actions while accessing the viewing experiences. The one or more actions may include, but are not limited to, holding the digital device at multiple distances and at multiple positions, reading single character against multiple backgrounds, reading multiple characters with different spacing and against multiple backgrounds, viewing or reading in different light intensity or indoor or outdoor, and providing feedback on viewing experiences for multiple digital contents in multiple ambient conditions surrounding the digital device.

In operation, the processors 101, at a first instance, determine a plurality of first vision parameters for two or more viewing positions based on a plurality of first sensor parameters and a plurality of viewing experiences of the user for the two or more viewing positions. It should be noted that the processors 101 is configured to perform statistical operations on the plurality of vision parameters determined for the two or more viewing positions to further determine a plurality of vision parameters for multiple viewing positions other than those determined earlier. The statistical operations may include, but are not limited to, an extrapolation, an interpolation, a regression, a multi variable regression, an association rule between various parameters (mandatory, optional and conditional) using frequent pattern (FP) growth algorithm, a priori or other association rule finding algorithms (mandatory, optional and conditional based on user is inside or outside). The processors 101 then derive a base viewability index based on the plurality of first vision parameters so determined for the multiple viewing positions. As noted above, the processors 101 then create a user profile comprising the base viewability index of the user and save the same in the storage medium 102.

The processors 101, at a subsequent instance, determine a plurality of subsequent vision parameters for a current viewing position based on a plurality of subsequent sensor parameters for the current viewing position and attributes of a digital content. The plurality of attributes of the digital content include, but are not limited to, a font color, a font size, a font style, a font type, a font contrast vis-a-vis background, a spacing between the letters, words, and lines, a number of columns, a size of margins, an amount of indentation, an image size, an image contrast vis-à-vis background, and a spacing between images. The processors 101 then derive a dynamic viewability index based on the plurality of subsequent vision parameters for the current viewing position. The processors 101 further access the user profile and thereby the base viewability index of the user from the storage medium based on an identification of the user. The processors 101 then dynamically adjust display settings based on a comparison between the dynamic viewability index and the base viewablity index. The display settings may include, but are not limited to, a display contrast, a display brightness, a font size, an orientation angle, and a spacing between letters, words, lines, and images. The display 103 then presents the digital content to the user based on the adjusted display settings.

As will be appreciated by one skilled in the art, a variety of processes may be employed for improving viewing experience of the user in real time on a digital device. For example, the exemplary system 100 may improve viewing experience of the user by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 2:
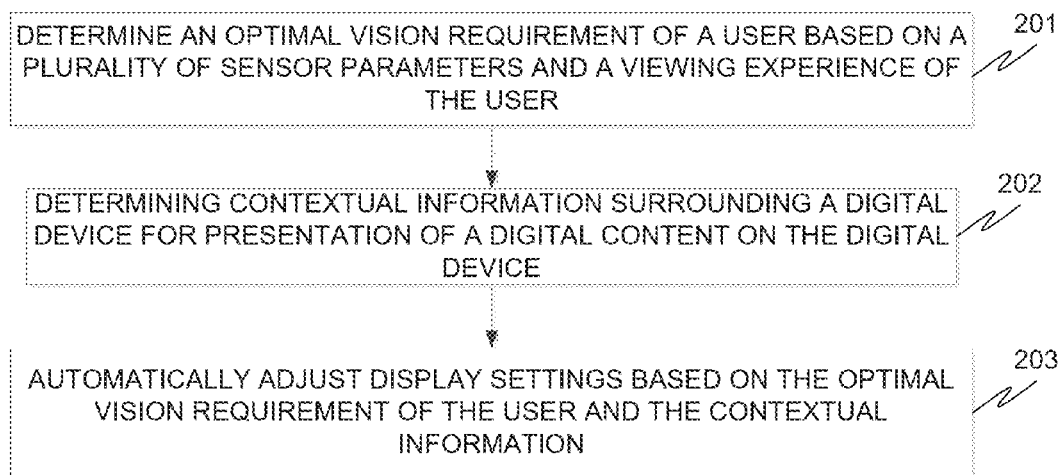
FIG. 2 is a flow diagram of an exemplary process for improving viewing experience of a user on a digital device in accordance with some embodiments of the present disclosure.

For example, referring now to FIG. 2, exemplary control logic 200 for improving viewing experience of a user on a digital device via a system, such as system 100, is depicted via a flowchart in accordance with some embodiments of the present disclosure. As illustrated in the flowchart, the control logic 200 includes the steps of determining an optimal vision requirement of the user based on a plurality of sensor parameters and a viewing experience of the user at step 201, determining contextual information surrounding the digital device for presentation of a digital content on the digital device at step 202, and automatically adjusting display settings based on the optimal vision requirement of the user and the contextual information at step 203.

At step 201, the digital device, having a display and sensors, captures several sensor parameters and user's viewing experiences and subsequently determines vision parameters with respect to the user based on the sensor parameters and user's viewing experiences. In some embodiments, such details may be collected by guiding the user, via the user interface, to hold the digital device at "x" positions, in increasing or decreasing order of distances, from the eyes of the user. For example, user's preferred holding distances or positions for reading or viewing may be captured using the embedded proximity sensor. User's face may be captured by the camera and size of user's face and distance between user's eyes pupils are determined by processing the image of the user's face. User's linear acceleration in each of three coordinate axis may be captured using embedded accelerometer and the pitch-yaw-roll rates for each of the above holding positions are determined from the linear acceleration in each of three coordinate axis. User's location indoor or outdoor is determined using relative beacon power at each of the above holding positions using beacon technology. Light intensity at each of the above holding positions is captured using embedded light sensor. Similarly, user's direction of holding is determined by using gyroscope. Further, at each of the positions, user is shown single, multiple characters at different spacing and backgrounds or images at different backgrounds via the user interface. Reading time for each different font size at the above position is calculated and stored. Similarly, viewing experience for each different image is noted and stored.

The exemplary control logic, at step 201, further involves deriving intermediate points between or outside the above mentioned "x" distance positions using linear regression, interpolation, or extrapolation techniques. The remaining values for vision parameters for the intermediate points are computed and stored using co-efficient factor for proximity distance, pitch-yaw-roll rate, light intensity, location, font size, and so forth. The exemplary control logic, at step 201, further involves deriving and storing a unique vector i.e., a base viewability index based on the data collected from multiple sensors and other sources with respect to the viewing distance, thereby determining the optimal vision requirement of the user. A profile of the user is created comprising information related to optimal vision requirement of the user. It should be noted that different profiles may be created for same or different users during training phase, which may be tagged against corresponding biometric signatures of the users.

At step 202, as the user starts using the digital device for reading or viewing any digital content on the display, the digital device detects ambient conditions or contextual information surrounding the device. The contextual information may include vision parameters for a current viewing position based on sensor parameters for the current viewing position and attributes of a digital content. For example, contextual information may be user's current holding position which is derived using the measurement details from the sensors such as proximity sensor, accelerometer, beacon, gyroscope, and so forth. User's face size and inter-pupil distance may be determined by processing the image of the user's face captured by the camera. A current brightness and contrast data may be determined from the digital device settings. Similarly, current font type, font size, line/word/letter spacing may be determined from the attributes of the digital content being presented to the user or from the digital device settings. Additionally, whether the user is indoor or outdoor may be determined from accelerometer readings and GPS information or from beacon information. The current ambient light intensity may be determined by brightness intensity of light source (e.g., camera) if indoor and based on time of day, location of sun position, weather information if outdoor.

The exemplary control logic, at step 203, involves deriving new viewability index of the user dynamically. In some embodiments, new viewability index is derived using linear regression, extrapolation or interpolation technique using co-efficient factor for the current instance of proximity distance, pitch-yaw-roll rate, light intensity, location, font size, and so forth. The exemplary control logic, at step 203, further involves retrieving stored user profile that provides the base viewability index. It should be noted that, retrieval of user profiles and subsequent processing can take place based on specific user. For example, the device can authenticate and recognize the specific user against the stored biometric signature and accordingly invoke the related profile.

Further, if the "new viewability index" is less then or greater than "base viewability index", then the control logic determines this as a low vision condition and triggers automatic configuration of the display settings. On determination of low vision condition, vision enhancement parameters are derived to adjust brightness, font size, spacing between line/word/letter, light intensity, orientation angle, and so forth. The digital device is then configured with the derived low vision enhancement parameters for improved viewing experience. It should be noted that if low vision condition is due to bright sunlight (high glare) or complete darkness or other similar conditions a warning may be presented (via display or audio) that the ambient condition is not suitable for viewing or reading. Alternatively, in some embodiments, an option may be provided to the user to switch to audio mode (e.g., text-to-speech, voice commands, and so forth) if viewability is below a threshold value.

Figure 3:
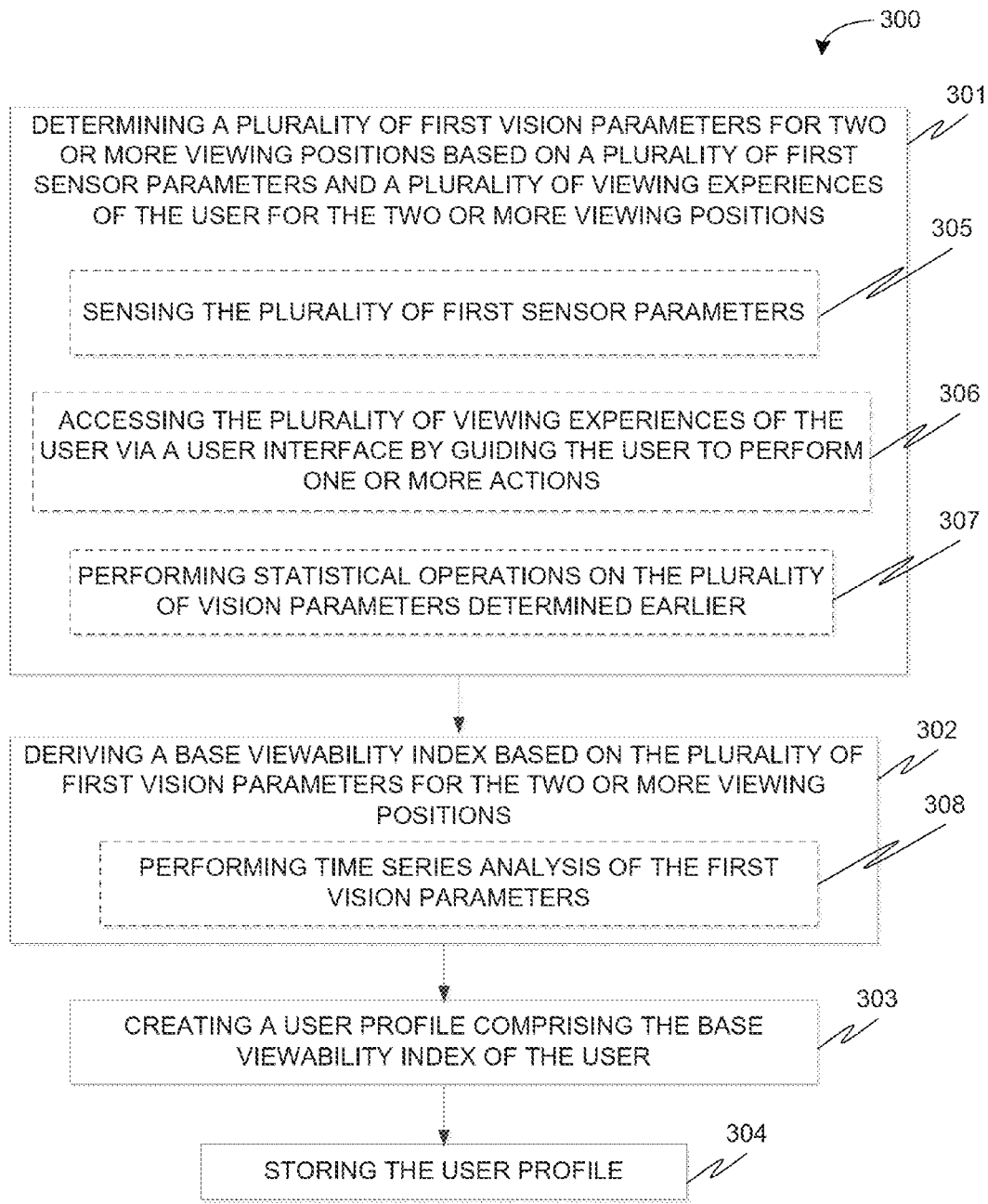
FIG. 3 is a flow diagram of a detailed exemplary process for determining optimal vision requirement of a user and for creating a user profile in accordance with some embodiments of the present disclosure.

Referring now to FIG. 3, exemplary control logic 300 for determining optimal vision requirement of a user and for creating a user profile is depicted via a flowchart in accordance with some embodiments of the present disclosure. As illustrated in the flowchart, the control logic 300 includes the steps of determining a plurality of first vision parameters for two or more viewing positions based on a plurality of first sensor parameters and a plurality of viewing experiences of the user for the two or more viewing positions at step 301, deriving a base viewability index based on the plurality of first vision parameters for the two or more viewing positions at step 302, and creating a user profile comprising the base viewability index of the user at step 303. In some embodiments, the control logic 300 may further include the step of storing the user profile at step 304. Thus, the control logic 300 may be employed to create and save multiple profiles for same or different users during training phase.

In some embodiments, determining at step 301 comprises sensing the plurality of first sensor parameters at step 305 and accessing the plurality of viewing experiences of the user via a user interface by guiding the user to perform one or more actions discussed above at step 306. Additionally, in some embodiments, determining at step 301 further comprises performing statistical operations on the plurality of vision parameters determined earlier at step 307. Further, in some embodiments, deriving the viewability index at step 302 comprises performing time series analysis of the first vision parameters at step 308.

Figure 4:
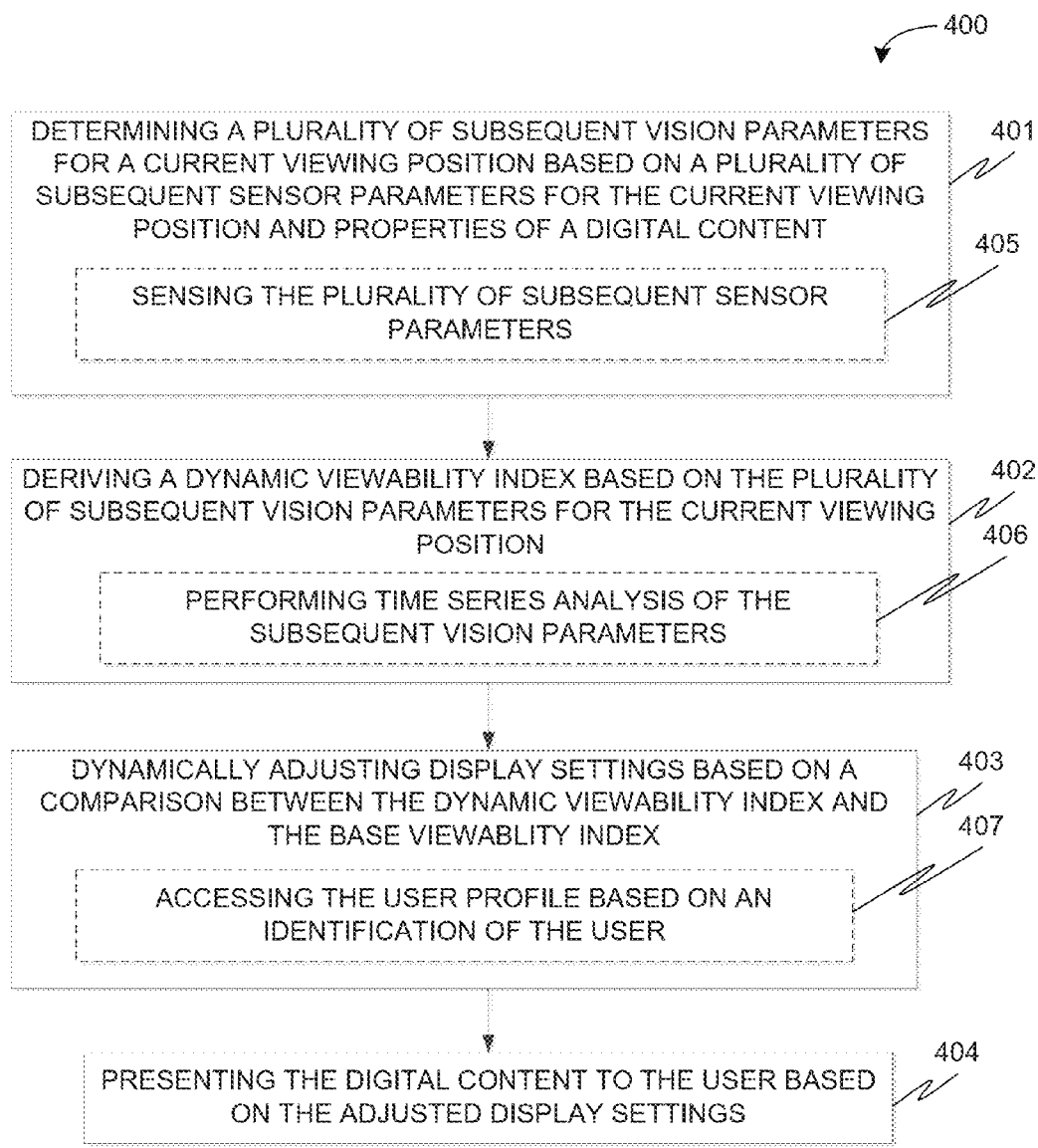
FIG. 4 is a flow diagram of a detailed exemplary process for dynamically improving viewing experience of a user while presenting a digital content on a digital device in accordance with some embodiments of the present disclosure.

Referring now to FIG. 4, exemplary control logic 400 for dynamically improving viewing experience of a user while presenting a digital content on a digital device is depicted via a flowchart in accordance with some embodiments of the present disclosure. As illustrated in the flowchart, the control logic 400 includes the steps of determining a plurality of subsequent vision parameters for a current viewing position based on a plurality of subsequent sensor parameters for the current viewing position and attributes of a digital content at step 401, deriving a dynamic viewability index based on the plurality of subsequent vision parameters for the current viewing position at step 402, dynamically adjusting display settings based on a comparison between the dynamic viewability index and the base viewablity index at step 403, and presenting the digital content to the user based on the adjusted display settings at step 404.

In some embodiments, determining at step 401 comprises sensing the plurality of subsequent sensor parameters at step 405. Additionally, in some embodiments, deriving dynamic viewability index at step 402 comprises performing time series analysis of the subsequent vision parameters at step 406. Further, in some embodiments, dynamically adjusting at step 403 comprises accessing the user profile based on an identification of the user at step 407. It should be noted that, in some embodiments, the control logic 300 and 400 may further include the step of accessing weather and vision related corroborative information from external sources.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
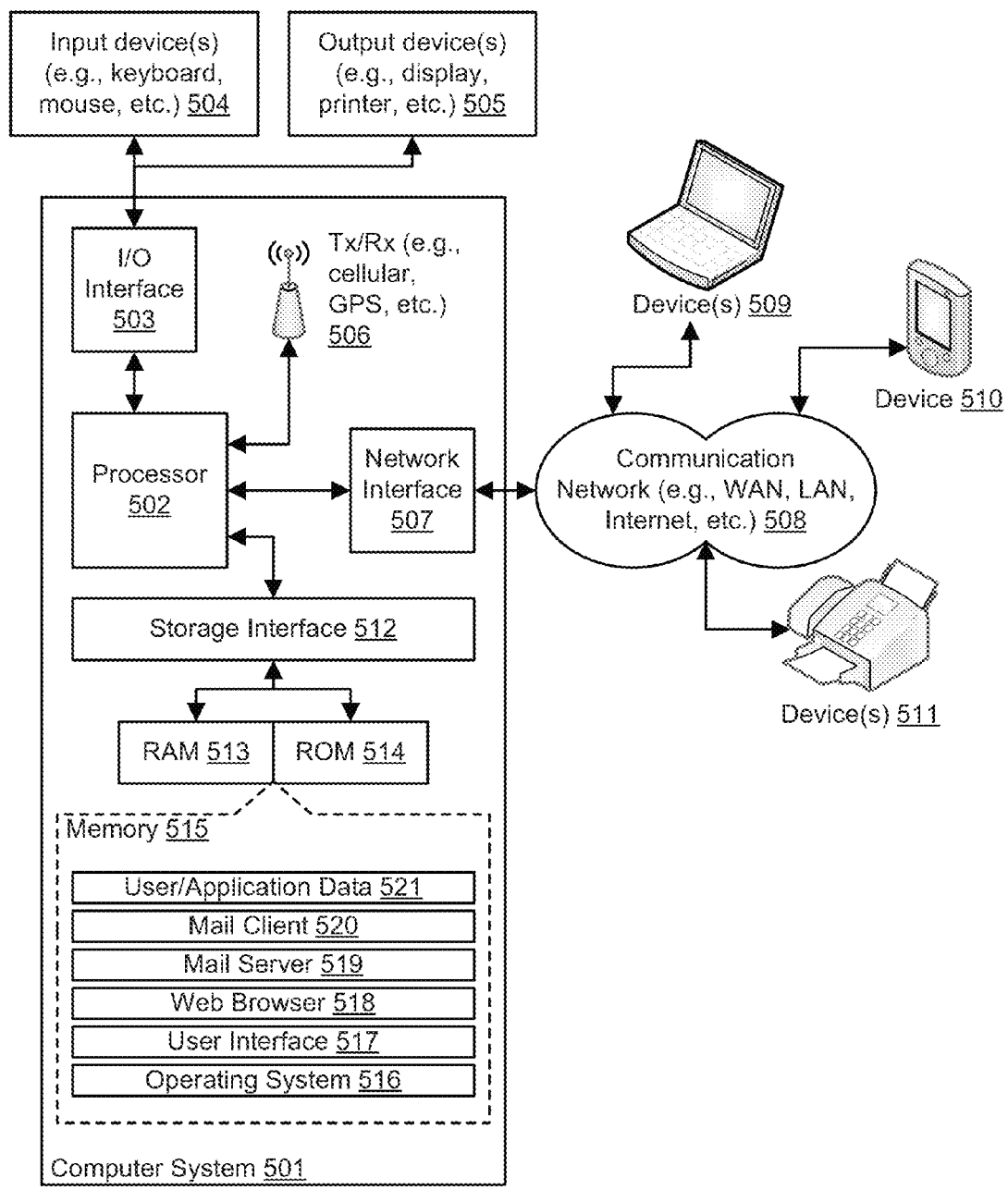
FIG. 5 is a block diagram of an exemplary computer system for implementing embodiments consistent with the present disclosure.

Referring now to FIG. 5, a block diagram of an exemplary computer system 501 for implementing embodiments consistent with the present disclosure is illustrated. Variations of computer system 501 may be used for implementing system 100 for improving viewing experience of a user. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., sensor parameters, vision parameters, user profiles, viewability indices, attributes of digital content, display settings, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for self-adjusting vision enhancer in the digital device to compensate for poor viewability or readability on the display device in real-time. The technique results in efficient and effective vision enhancement by accommodating a wide variety of user preferences and behaviors through training and accounting for environment surrounding the digital device. The techniques described in the embodiments discussed above further provides real-time vision enhancement as computation of dynamic viewablity index and adjustment of settings take place in real-time.

The specification has described system and method for improving viewing experience of a user. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for improving viewing experience of a user on a digital device, the system comprising:
   a plurality of sensors configured to capture sensor parameters;
   a processor, at a first instance, configured to:
      determine a plurality of first vision parameters for two or more viewing positions based on a plurality of first sensor parameters and a plurality of viewing experiences of the user for the two or more viewing positions, wherein the plurality of first vision parameters comprises one or more pitch-yaw-roll rates, for each of the two or more viewing positions, that are determined based on user's linear acceleration in each of three coordinate axes respectively;
      derive a base viewability index based on the plurality of first vision parameters for the two or more viewing positions by performing time series analysis of the first vision parameters; and
      create a user profile comprising the base viewability index of the user; and
   the processor, at a subsequent instance, configured to:
      determine a plurality of subsequent vision parameters for a current viewing position based on a plurality of subsequent sensor parameters for the current viewing position and attributes of a digital content;
      derive a dynamic viewability index based on the plurality of subsequent vision parameters for the current viewing position by performing time series analysis of the subsequent vision parameters using a co-efficient factor for the subsequent vision parameters, wherein the base and dynamic viewability indexes are vectors corresponding to the user that respectively define a viewing requirement or a viewing experience of the user at a given ambient condition surrounding the system or the digital device; and
      dynamically adjust display settings based on a comparison between the dynamic viewability index and the base viewability index, and
   a display configured to present the digital content to the user based on the adjusted display settings.

2. The system of claim 1, wherein the plurality of sensors comprises at least one of a GPS sensor, an accelerometer, a gyroscope, a proximity sensor, a light intensity detector, an infrared sensor, a camera, a microphone, a humidity sensor, a beacon, or a biometric sensor.

3. The system of claim 1, wherein the sensor parameters comprise at least one of a location of the user, a viewing distance, a viewing direction, a viewing position, an ambient light intensity, a glare, a current display settings, a camera picture, a video stream, a voice recording, another nearby beacon, a position of sun, a humidity level, or a biometric signature.

4. The system of claim 1, wherein the vision parameters comprise at least one of a size of face of the user, a inter pupil distance of the user, a movement of pupils, a relative viewing distance, a relative viewing direction, a relative viewing position, an indoor or an outdoor position of the digital device, a relative position of sun with respect to the digital device, a humidity level on a surface of the display of the digital device, a length of text line, a time taken by the user to read a text, a number of pauses taken during reading, or a number of filler phrases used during reading.

5. The system of claim 1, wherein the processor, at the first instance, is configured to access the plurality of viewing experiences of the user via a user interface by guiding the user to perform one or more actions.

6. The system of claim 5, wherein the one or more actions comprises at least one of holding the digital device at multiple distances and at multiple positions, reading single character against multiple backgrounds, reading multiple characters with different spacing and against multiple backgrounds, viewing or reading in different light intensity or indoor or outdoor, or providing feedback on viewing experiences for multiple digital contents in multiple ambient conditions surrounding the digital device.

7. The system of claim 1, wherein the processor, at the first instance, is configured to determine the plurality of first vision parameters for the two or more viewing positions by performing statistical operations on the plurality of first vision parameters determined earlier, and wherein statistical operation comprises at least one of an extrapolation, an interpolation, a regression, and an association rule.

8. The system of claim 1, wherein the plurality of attributes of the digital content comprises a font color, a font size, a font style, a font type, a font contrast vis-a-vis background, a spacing between the letters, words, and lines, a number of columns, a size of margins, an amount of indentation, an image size, an image contrast vis-à-vis background, and a spacing between images.

9. The system of claim 1, further comprising a storage medium configured to store the user profile, and wherein the processor, at the subsequent instance, is configured to access the user profile from the storage medium based on an identification of the user.

10. The system of claim 1, further comprising a communication network configured to provide access to weather and vision related corroborative information from external sources.

11. The system of claim 1, wherein the display settings comprise a display contrast, a display brightness, a font size, an orientation angle, and a spacing between letters, words, lines, and images.

12. The system of claim 1, wherein the processor, at the subsequent instance, is further configured to provide a warning for non-suitability of viewing or reading exercise, or an option to switch to audio mode if the dynamic viewability index is below a threshold value.

13. A method for improving viewing experience of a user on a digital device, the method comprising:
at a first instance,
determining a plurality of first vision parameters for two or more viewing positions based on a plurality of first sensor parameters and a plurality of viewing experiences of the user for the two or more viewing positions, wherein the plurality of first vision parameters comprises one or more pitch-yaw-roll rates, for each of the two or more viewing positions, that are determined based on user's linear acceleration in each of three coordinate axes respectively;
deriving a base viewability index based on the plurality of first vision parameters for the two or more viewing positions by performing time series analysis of the first vision parameters; and
creating a user profile comprising the base viewability index of the user; and
at a subsequent instance,
determining a plurality of subsequent vision parameters for a current viewing position based on a plurality of subsequent sensor parameters for the current viewing position and attributes of a digital content;
deriving a dynamic viewability index based on the plurality of subsequent vision parameters for the current viewing position by performing time series analysis of the subsequent vision parameters using a co-efficient factor for the subsequent vision parameters, wherein the base and dynamic viewability indexes are vectors corresponding to the user that respectively define a viewing requirement or a viewing experience of the user at a given ambient condition surrounding the system or the digital device;
dynamically adjusting display settings based on a comparison between the dynamic viewability index and the base viewability index; and
presenting the digital content to the user based on the adjusted display settings.

14. The method of claim 13, wherein determining, at the first instance, comprises:
sensing the plurality of first sensor parameters; and
accessing the plurality of viewing experiences of the user via a user interface by guiding the user to perform one or more actions; and
wherein determining, at the subsequent instance, comprises:
sensing the plurality of subsequent sensor parameters.

15. The method of claim 13, wherein determining, at the first instance, comprises performing statistical operations on the plurality of vision parameters determined earlier, and wherein statistical operation comprises at least one of an extrapolation, an interpolation, a regression, or an association rule.

16. The method of claim 13, further comprising storing the user profile, and wherein dynamically adjusting, at the subsequent instance, comprises accessing the user profile based on an identification of the user.

17. The method of claim 13, further comprising providing, at the subsequent instance, a warning for non-suitability of viewing or reading exercise, or an option to switch to audio mode if the dynamic viewability index is below a threshold value.

18. A non-transitory computer-readable medium having stored thereon a set of computer-executable instructions for causing a computer comprising one or more processors to perform steps comprising:
at a first instance,
determining a plurality of first vision parameters for two or more viewing positions based on a plurality of first sensor parameters and a plurality of viewing experiences of the user for the two or more viewing positions, wherein the plurality of first vision parameters comprises one or more pitch-yaw-roll rates, for each of the two or more viewing positions, that are determined based on user's linear acceleration in each of three coordinate axes respectively;
deriving a base viewability index based on the plurality of first vision parameters for the two or more viewing positions by performing time series analysis of the first vision parameters; and
creating a user profile comprising the base viewability index of the user; and
at a subsequent instance,
determining a plurality of subsequent vision parameters for a current viewing position based on a plurality of subsequent sensor parameters for the current viewing position and attributes of a digital content;

deriving a dynamic viewability index based on the plurality of subsequent vision parameters for the current viewing position by performing time series analysis of the subsequent vision parameters using a co-efficient factor for the subsequent vision parameters, wherein the base and dynamic viewability indexes are vectors corresponding to the user that respectively define a viewing requirement or a viewing experience of the user at a given ambient condition surrounding the system or the digital device;

dynamically adjusting display settings based on a comparison between the dynamic viewability index and the base viewability index; and presenting the digital content to the user based on the adjusted display settings.

* * * * *